United States Patent [19]

Azuchi

[11] Patent Number: 4,477,859
[45] Date of Patent: Oct. 16, 1984

[54] ROTARY ELECTRIC COMPONENT

[75] Inventor: Yukihiro Azuchi, Sabae, Japan

[73] Assignee: Murata Manufacturing Co., Ltd., Japan

[21] Appl. No.: 533,548

[22] Filed: Sep. 19, 1983

[30] Foreign Application Priority Data

Sep. 22, 1982 [JP] Japan .................................. 57-165711

[51] Int. Cl.³ .............................................. H01G 5/06
[52] U.S. Cl. .................................................. 361/278
[58] Field of Search ......................... 361/277, 278, 293

[56] References Cited

U.S. PATENT DOCUMENTS 3,246,217 4/1966 Wambach ............................ 361/293
3,258,665 6/1966 Sperry .................................. 361/293
4,220,980 9/1980 Yamamoto et al. ................. 361/278

Primary Examiner—Donald A. Griffin
Attorney, Agent, or Firm—Ostrolenk, Faber, Gerb & Soffen

[57] ABSTRACT

A rotary electric component comprising a support structure made of synthetic resin, at least one first elongated electric terminal member made of electroconductive material and having one end positioned exteriorly of the support structure for the electric connection with an external circuit element, a rotor, and a second elongated electric terminal member made of electroconductive material and having one end positioned exteriorly of the support structure for the electric connection with an external circuit element. The second terminal member is supported by the support structure in the form as partially embedded in the support structure and has the other end formed into a tubular shaft for the support of the rotor for rotation thereabout. The shaft integral with the second terminal member is formed by the use of any known metal drawing technique and has a closed end at the tip thereof opposite to the second terminal member. The closed end of the shaft is, after the rotor has been mounted thereon for rotation thereabout relative to the support structure, rivetted or battered so as to expand radially outwardly to a diameter greater than the mounting hole in the rotor through which the shaft extends.

5 Claims, 7 Drawing Figures

ROTARY ELECTRIC COMPONENT

BACKGROUND OF THE INVENTION

This invention generally relates to an electric component such as, for example, a trimmer capacitor, a variable resistor or a rotary switch, and more particularly, to the electric component of a type having a rotary mechanism.

A prior art rotary electric component such as, for example, a trimmer capacitor including a rotor and a stator comprises a head shaft having its head rigidly connected to the rotor for rotation together therewith and rotatably extending through the stator or a combination of stator and support base of synthetic resin, the free end of the shaft opposite to the head being connected to a terminal member located on one side of the stator remote from the rotor. For connecting the free end of the shaft to the terminal member, the free end of the shaft is bored to form an axially inwardly extending recess that defines a thin-walled annular end therearound. This thin-walled annular end of the shaft is, after having been passed through a bearing opening in the terminal member, crimped so as to expand radially outwardly thereby avoiding any possible separation of the terminal member from the shaft.

In this construction, that portion of the terminal member where the bearing opening is defined is so shaped as to provide a spring washer which, in the assembled condition, exerts an urging force to bring the rotor and the stator close together.

This type of rotary electric component is usually mounted as an electric component part on a printed circuit board with its terminal members soldered to printed wirings by the use of a dip-soldering method or a reflow-soldering method. In view of this, it has now been found that, when the dip-soldering or reflow-soldering method is applied to the prior art rotary electric component of the construction described above, the rotary electric component itself tends to be warmed to such an elevated temperature as to result in the thermal deformation of the radially outwardly crimped, thin-walled annular end of the shaft. Once this happens, a loss of firm connection of the shaft to the terminal member is prone to occur with consequent reduction in torque of the rotor.

SUMMARY OF THE INVENTION

Accordingly, this invention has been developed with a view to substantially eliminating the above described problem inherent in the prior art rotary electric component and has for its essential object to provide an improved rotary electric component which can withstand a relatively high temperature to which it may be exposed during the process of dip-soldering or reflow-soldering.

Another object of this invention is to provide an improved rotary electric component of the type referred to above, which can be readily manufactured substantially with no increased number of component parts employed and substantially without incurring the unreasonably increased manufacturing cost.

A further object of this invention is to provide an improved rotary electric component of the type referred to above, which is reliable in operation for an extended period of use.

To this end, this invention provides a rotary electric component comprising a support structure made of synthetic resin, at least one first elongated electric terminal member made of electroconductive material and having one end positioned exteriorly of the support structure for the electric connection with an external circuit element, a rotor, and a second elongated electric terminal member made of electroconductive material and having one end positioned exteriorly of the support structure for the electric connection with an external circuit element. In accordance with this invention, the second terminal member is supported by the support structure in the form as partially embedded in the support structure and has the other end formed into a tubular shaft for the support of the rotor for rotation thereabout. The shaft integral with the second terminal member is formed by the use of any known metal drawing technique and has a closed end at the tip thereof opposite to the second terminal member. The closed end of the shaft is, after the rotor has been mounted thereon for rotation thereabout relative to the support structure, rivetted or battered so as to expand radially outwardly to a diameter greater than the mounting hole in the rotor through which the shaft extends.

The interior of the shaft may either be filled, or not be filled, with the synthetic resin forming the support structure.

BRIEF DESCRIPTION OF THE DRAWINGS

These and other objects and features of this invention will become readily understood from the following detailed description taken in conjunction with preferred embodiments thereof with reference to the accompanying drawings, in which.

DETAILED DESCRIPTION OF THE EMBODIMENTS

Figure 1:
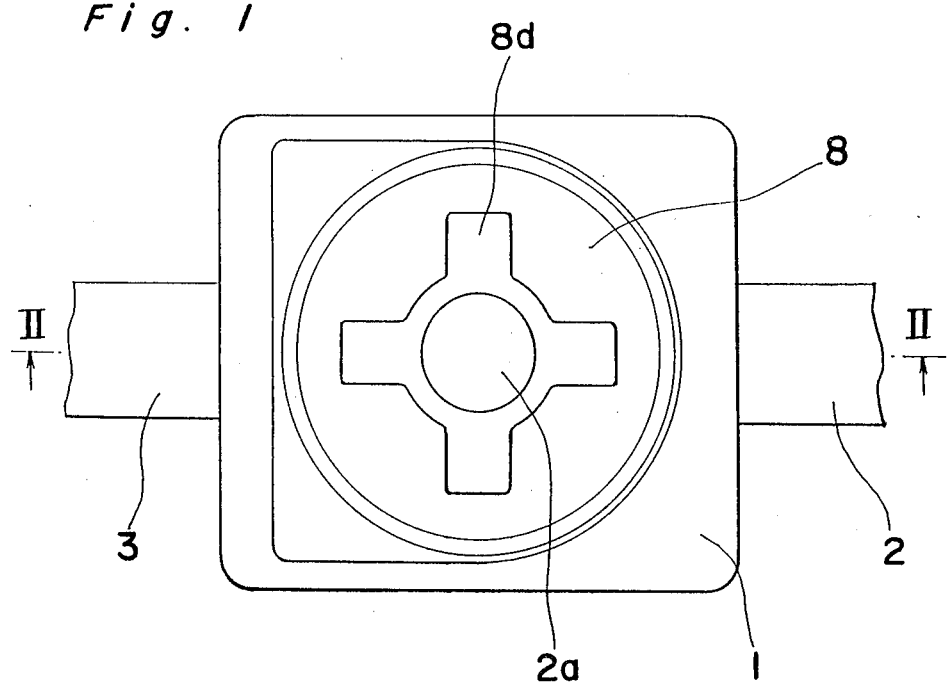
FIG. 1 is a top plan view of a trimmer capacitor according to a first preferred embodiment of this invention.

Before the description of this invention proceeds, it is to be noted that like parts are designated by like reference numerals throughout the accompanying drawings.

Figure 2:
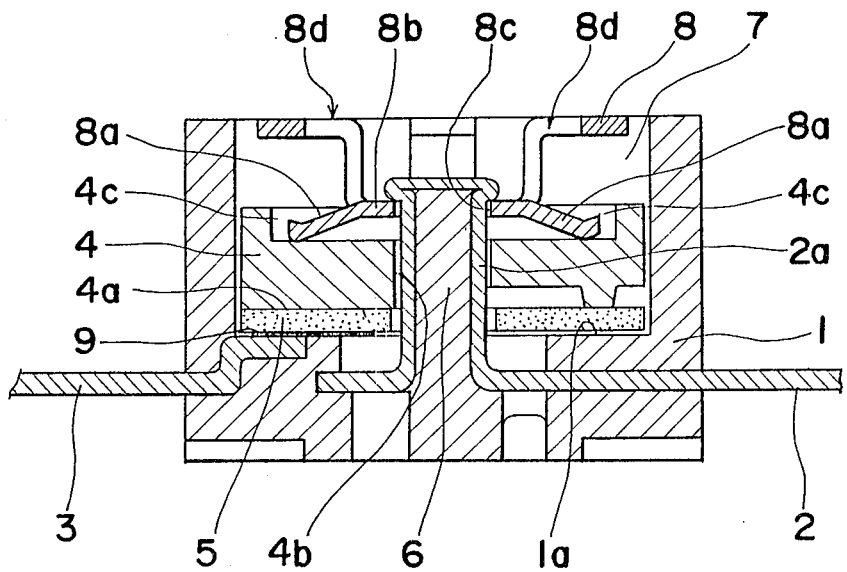
FIG. 2 is a cross-sectional view taken along the line II—II in FIG. 1.

Referring first to FIGS. 1 and 2, there is shown a trimmer capacitor as a rotary electric component embodying this invention. The illustrated trimmer capacitor comprises a casing 1 made of a heat-resistant thermosetting resin resistant to a heat of about 300° C., said casing 1 being molded together with elongated rotor and stator terminal members 2 and 3 of electroconductive material.

The rotor terminal member 2 is preferably made of metal such as, for example, brass having a good electroconductivity and has one end extending exteriorly of the casing 1 and the other end situated interiorly of the casing 1. The other end of the rotor terminal member 2 is formed, by the use of any known press work, for example, a metal drawing technique, into a unitary tubular shaft 2a having a closed end at the tip thereof. This rotor terminal member 2 having the tubular shaft 2a integrally formed therewith is embedded in the casing 1 during the molding of the latter with the shaft 2a protruding into a recess 7 in the casing 1 generally at right angles to a support face 1a which defines the bottom of the recess 7 and has a dielectric body 5 placed thereon together with the rotor 4. During the molding of the casing 1, the synthetic resin in a fluid state, which is used to form the casing 1, flows into the interior of the shaft 2a and, when solidified, forms a core 6 continued to the casing 1.

The dielectric body 5 placed on the support face 1a around the shaft 2a has its undersurface deposited, or otherwise bonded, with a generally semicircular electrode 9 which is held in sliding engagement with the stator terminal member 3 embedded in the casing 1 and having one end engaged thereto and the other end situated exteriorly of the casing 1 for electric connection with an external circuit element. The rotor 4 having a mounting opening 4b defined therein is positioned within the recess 7, overlaying the dielectric body 5, with the shaft 2a rotatably extending through the mounting opening 4b. This rotor 4, made of metal, has its undersurface formed with a recess providing a generally semicircular electrode 4a thereon, the electrode 4a slidingly contacting an upper surface of the dielectric body opposite to the electrode 9, and its upper surface formed with a circular recess 4c, concentric with the mounting opening 4b, for the accommodation of a rotor retainer 8 therein.

The rotor retainer 8 is made of a metal having a resiliency such as, for example, phosphor bronze and a plurality of resilient tongues 8a and a peripheral support area 8b both defined therein. The resilient tongues 8a are formed by slitting respective portions of a metallic disc (not shown) between its peripheral edge and its center and then bending them so as to extend generally downwardly as viewed in FIG. 2, leaving the peripheral portion of the metallic disc which is pressed so as to extend generally upwardly to form the support area 8b. In any event, the rotor retainer 8 of the particular shape can be formed by the use of any known press work, and, at this time, a bearing hole 8c and a plurality of slots 8d can also be formed in the rotor retainer 8.

The rotor retainer 8 is held in position above the rotor 4 and within the recess 4c with the resilient tongues 8a urging the rotor 4 and then the dielectric body 5 towards the support face 1a. For this purpose, after the rotor retainer 8 has been placed on the rotor 4 positioned immediately above the dielectric body 5, with the closed end of the shaft 2a passing through the bearing hole 8c in the rotor retainer 8, the closed end of the shaft 2a is rivetted or battered, by the use of a known rivetting machine of gyro-type or auto-punch type, so as to expand radially outwardly to a diameter greater than the diameter of the bearing hole 8c to hold the assembly of rotor 4 and dielectric body 5 in position as sandwiched between the support face 1a and the resilient tongues 8a. In this assembled condition, the rotor retainer 8 is rotatable together with the rotor 4 about the shaft 2a.

In the trimmer capacitor of the construction described above, the static capacitance thereof is determined by the relative positioning of the electrodes 4a and 9 with respect to the dielectric body 5. Therefore, the static capacitance of the trimmer capacitor can be adjusted by adjusting the position of the electrode 4a fast with the rotor 4 relative to the electrode 9 fast with the dielectric body 5 and this can be accomplished by rotating the rotor 4 relative to the casing 1 with the aid of a screw driver (not shown) inserted in one of the slots 8d in the rotor retainer 8.

Figure 3:
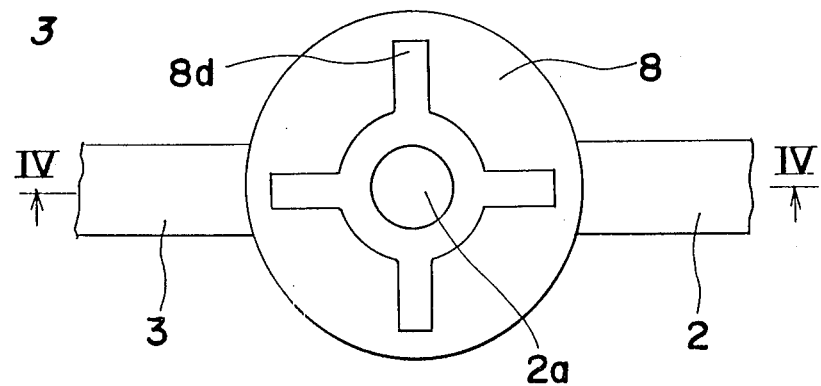
FIG. 3 is a top plan view of a trimmer capacitor of different type according to a second preferred embodiment of this invention.
Figure 4:
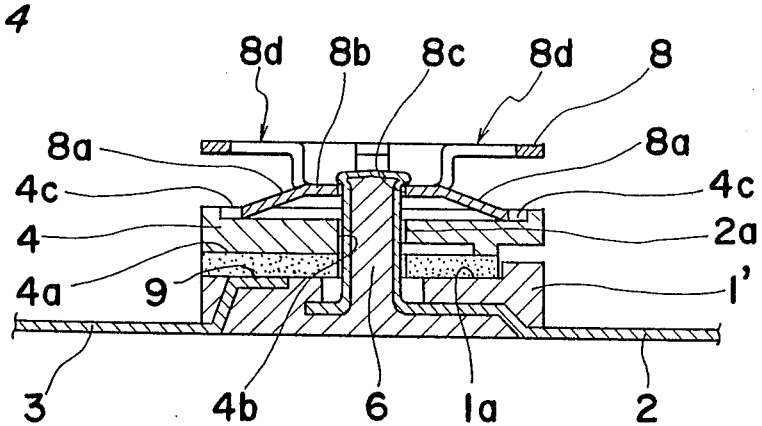
FIG. 4 is a cross-sectional view taken along the line IV—IV in FIG. 3.

In the foregoing embodiment shown in FIGS. 1 and 2, the casing 1 has been described and shown as having the recess 7. However, the use of the casing 1 is not essential, and it may be replaced with a support plate or base plate as shown by 1' in FIGS. 3 and 4. In this case, the support plate or base plate 1' is to be made of a synthetic resin having an electric insulating property.

Hereinafter, an example of application of this invention to a variable resistor will be described with reference to FIGS. 5 and 6.

Figure 5:
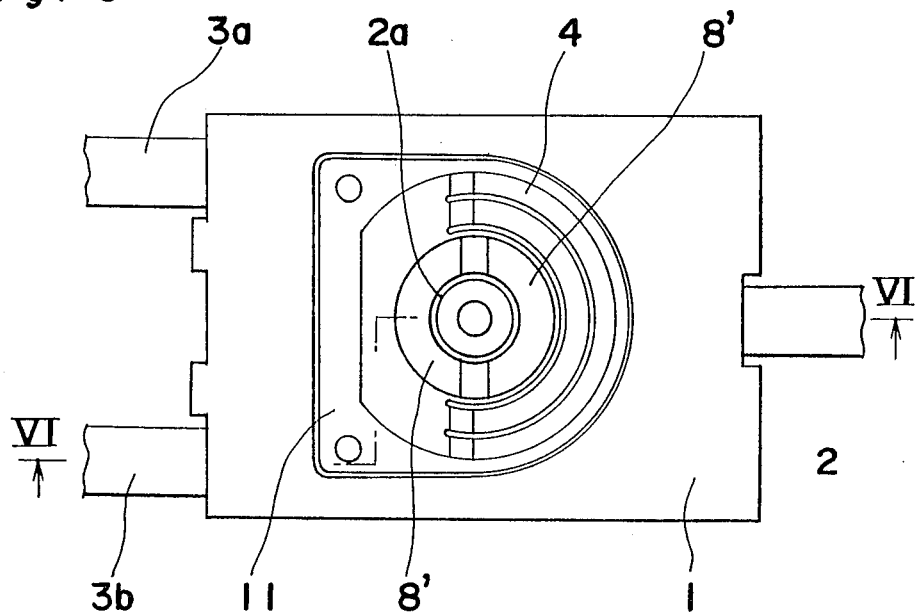
FIG. 5 is a top plan view of a variable resistor according to a third preferred embodiment of this invention.
Figure 6:
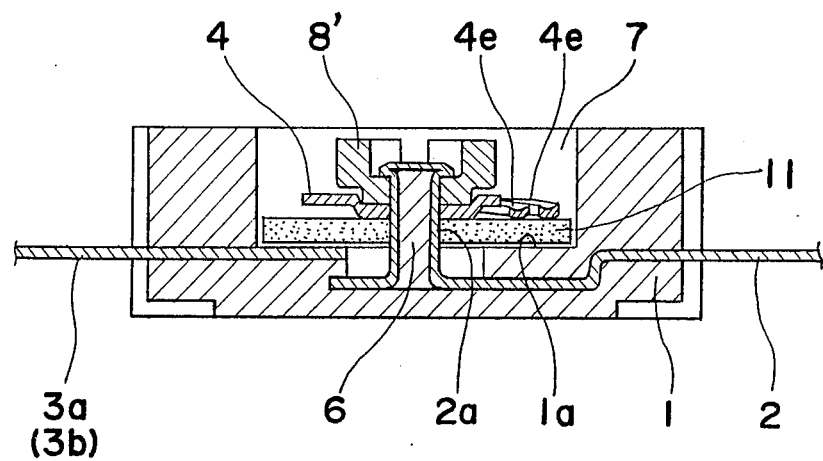
FIG. 6 is a cross-sectional view taken along the line VI—VI in FIG. 5.

Since the rotary electric component shown in FIGS. 5 and 6 is a variable resistor, only elements sandwiched between the rotor retainer 8 and the support face 1a differ in function and structure from those employed in the trimmer capacitor while the rotary mechanism remains the same. Specifically, as best shown in FIG. 5, two stator terminal members 3a and 3b are employed in the form as embedded in the casing 1 during the molding of the latter. In addition, instead of the dielectric body used in the trimmer capacitor shown in FIGS. 1 to 4, a resistance body 11 is employed. The rotor 4 employed in the variable resistor shown in FIGS. 5 and 6 is in the form of a centrally perforated disc having a pair of sliders 4e integrally formed therewith and protruding radially outwardly therefrom for the sliding engagement with an upper surface of the resistance body 11.

The rotor retainer may be of the construction shown in FIGS. 1 to 4, but is employed in the form of a rotor rotating piece as shown by 8'. As is the case with the forgoing embodiments shown respectively in FIGS. 1 and 2 and FIGS. 3 and 4, after the resistance body 11, the rotor 4 and the rotor rotating piece 8' have been placed within the recess 7 in the casing 1 with the shaft 2a extending therethrough in a manner similar to that described in connection with the foregoing embodiment shown in FIGS. 1 and 2, the closed end of the shaft 2a is rivetted or battered so as to expand radially outwardly to hold the assembly in position within the recess 7 and about the shaft 2a.

From the foregoing description, it has now become clear that this invention is featured in that the stator terminal member or members and the rotor terminal member are embedded in the casing or base plate during the molding of the latter, and that the rotor terminal member is integrally formed with the tubular shaft for the support of the rotor for rotation thereabout, the shaft having the closed end at the tip thereof opposite thereto which is subsequently rivetted or battered to expand radially outwards to retain the rotor in position. With this construction according to this invention, even though the rotary electric component is warmed up to an elevated temperature during the subsequent soldering process, the rivetted, closed end of the shaft is substantially free from the influence of heat and, therefore, will not be deformed. Thus, any possible reduction in torque of the rotor which has hitherto been observed in the prior art rotary electric component can advantageously be avoided.

Figure 7:
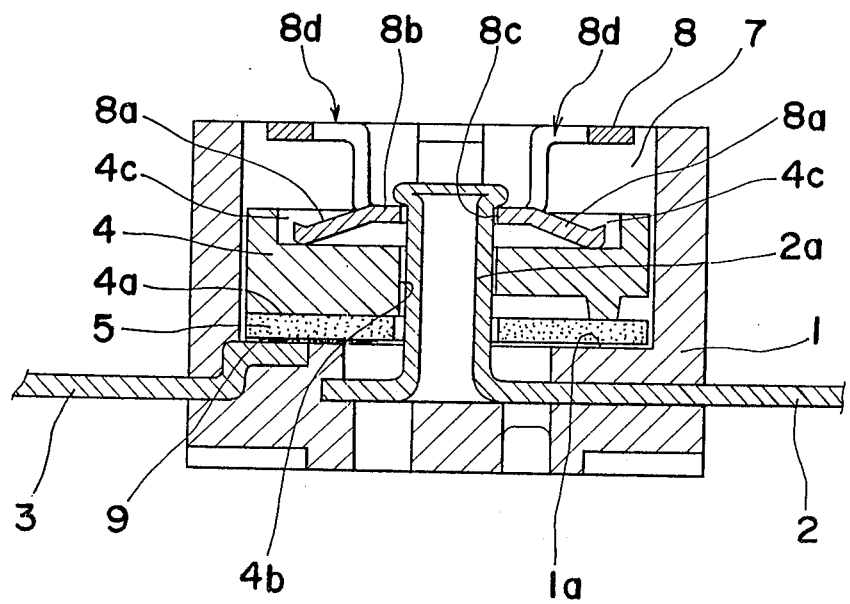
FIG. 7 is a view similar to FIG. 2, showing a modification applicable to all of the embodiments according to this invention.

In particular, where the shaft 2a has the core 6 therein, any possible buckling or deformation of the shaft 2a which would supposedly occur when the closed end thereof is rivetted or battered for the purpose described hereinbefore can be avoided. In any event, if the material for the rotor terminal member has a sufficient physical strength, the shaft 2a may not always be provided with the core 6 such as shown in FIG. 7.

According to this invention, a torque mechanism operable to cause the rotor to rotate when a torque greater than a predetermined value is applied to the rotor is constituted by a separate and independent spring member and, therefore, there is no need to constitute the torque mechanism by forming a spring portion on the rotor terminal member. Because of this, the rotor terminal member can advantageously be embedded in the molded casing or base plate together with the stator terminal member or members.

Although this invention has fully been described in connection with the preferred embodiments thereof with reference to the accompanying drawings, it is to be noted that various changes and modifications are apparent to those skilled in the art. By way of example, while the concept of this invention has been described and illustrated as applied to the trimmer capacitor and the variable resistor, it can be equally applicable to any other rotary electric component, for example, a rotary switch or the like where the rotary mechanism is required.

Accordingly, such changes and modifications are to be construed as included with the true scope of this invention as defined by the appended claims, unless they depart therefrom.

I claim:

1. A rotary electric component which comprises: a support structure made of synthetic resin, at least one first elongated electric terminal member made of electroconductive material and having one end positioned exteriorly of the support structure for the electric connection with an external circuit element, a rotor, and a second elongated electric terminal member made of electroconductive material and having one end positioned exteriorly of the support structure for the electric connection with an external circuit element, said first and second terminal members being partially embedded in the support structure with at least one portion the other ends of said first and second terminal members located generally adjacent to each other, said second terminal member being formed at the side of its other end into a tubular shaft for the support of the rotor for rotation thereabout, said shaft having a closed end at the tip thereof, said closed end of the shaft being, after the rotor has been mounted thereon for rotation thereabout relative to the support structure, rivetted so as to expand radially outwards to hold the rotor in position.

2. A component as claimed in claim 1, wherein said shaft has a filled core in its interior, said core being formed by allowing a part of the synthetic resin for the support structure to flow into the interior of the shaft during the molding of the support structure.

3. A component as claimed in claim 1 or 2, which is a trimmer capacitor.

4. A component as claimed in claim 1 or 2, which is a variable resistor.

5. A component as claimed in claim 1, wherein said shaft is formed by the use of a metal drawing technique.

* * * * *